United States Patent
Quiring et al.

(10) Patent No.: US 10,717,429 B2
(45) Date of Patent: Jul. 21, 2020

(54) METHOD FOR CONTROLLING THE PARKING PROCESS OF A HYBRID ELECTRIC VEHICLE

(71) Applicant: FORD GLOBAL TECHNOLOGIES, LLC, Dearborn, MI (US)

(72) Inventors: Stefan Quiring, Leverkusen (DE); Harald Stoffels, Cologne (DE); Moritz Klaus Springer, Hagen (DE); Christian Hofmann, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/895,629

(22) Filed: Feb. 13, 2018

(65) Prior Publication Data

US 2018/0229716 A1    Aug. 16, 2018

(30) Foreign Application Priority Data

Feb. 13, 2017   (DE) .................. 10 2017 202 189

(51) Int. Cl.
| | |
|---|---|
| *B60W 20/15* | (2016.01) |
| *B60W 10/08* | (2006.01) |
| *B60W 10/06* | (2006.01) |
| *B60W 30/06* | (2006.01) |
| *B60W 20/20* | (2016.01) |

(52) U.S. Cl.
CPC ............ *B60W 20/15* (2016.01); *B60W 10/06* (2013.01); *B60W 10/08* (2013.01); *B60W 20/20* (2013.01); *B60W 30/06* (2013.01); *B60W 2530/16* (2013.01); *B60W 2554/00* (2020.02); *Y02T 10/6226* (2013.01); *Y02T 10/6286* (2013.01); *Y10S 903/93* (2013.01)

(58) Field of Classification Search
CPC ...... B60W 20/15; B60W 20/20; B60W 10/06; B60W 10/08; B60W 30/06; B60W 2554/00; B60W 2530/16; Y02T 10/6226; Y02T 10/6286; Y10S 903/93
See application file for complete search history.

(56) References Cited

U.S. PATENT DOCUMENTS

| | | | | |
|---|---|---|---|---|
| 7,412,310 B2 * | 8/2008 | Brigham | .................. | B60K 6/48 180/65.28 |
| 8,744,684 B2 * | 6/2014 | Hong | .................. | B62D 15/0285 340/932.2 |

(Continued)

FOREIGN PATENT DOCUMENTS

| | | |
|---|---|---|
| DE | 102013221904 A1 | 5/2014 |
| DE | 102015208721 A1 | 11/2016 |

*Primary Examiner* — Peter D Nolan
(74) *Attorney, Agent, or Firm* — David B. Kelley; Brooks Kushman P.C.

(57) ABSTRACT

The invention relates to a method for controlling the parking process of a hybrid electric vehicle, in particular a mild hybrid electric vehicle, in which an electric motor and an internal combustion engine can act on the drive train at the same time and in which, furthermore, a starter motor is connected to the drive train. The principle of electric parking is to be solved by the invention. In order to achieve this, the electric motor is initially exclusively utilized as the drive for the parking process. When an obstacle is to be overcome in this case, which cannot be successfully overcome solely with the aid of the electric motor, the starter motor is activated.

13 Claims, 2 Drawing Sheets

(56) References Cited

U.S. PATENT DOCUMENTS

| | | | | |
|---|---|---|---|---|
| 8,781,662 B2* | 7/2014 | Park | ............... | B60K 6/445 |
| | | | | 701/22 |
| 9,175,660 B2* | 11/2015 | Gussen | ............... | B60W 10/06 |
| 9,327,705 B2* | 5/2016 | Schwitters | ............... | B60W 10/02 |
| 10,259,448 B2* | 4/2019 | Bucknor | ............... | B60K 6/387 |
| 2013/0151045 A1* | 6/2013 | Park | ............... | B60K 6/445 |
| | | | | 701/22 |
| 2013/0296119 A1* | 11/2013 | Reed | ............... | B60W 10/02 |
| | | | | 477/5 |
| 2013/0296126 A1* | 11/2013 | Gibson | ............... | B60K 6/30 |
| | | | | 477/5 |
| 2014/0365051 A1* | 12/2014 | Gussen | ............... | F02N 11/0833 |
| | | | | 701/22 |
| 2015/0266462 A1* | 9/2015 | Johri | ............... | B60W 10/02 |
| | | | | 701/22 |
| 2016/0107678 A1* | 4/2016 | Fischer | ............... | B62D 5/0457 |
| | | | | 701/41 |
| 2016/0347303 A1* | 12/2016 | Murata | ............... | B60W 20/15 |
| 2018/0050686 A1* | 2/2018 | Atluri | ............... | B60K 6/387 |

* cited by examiner

METHOD FOR CONTROLLING THE PARKING PROCESS OF A HYBRID ELECTRIC VEHICLE

CROSS-REFERENCE TO RELATED APPLICATION

This application claims foreign priority benefits under 35 U.S.C. § 119(a)-(d) to DE Application 10 2017 202 189.6, filed Feb. 13, 2017, which is hereby incorporated by reference in its entirety.

TECHNICAL FIELD

The invention relates to a method for controlling the parking process of a hybrid electric vehicle, in particular a mild hybrid electric vehicle, in which an electric motor and an internal combustion engine can act on the drive train at the same time and in which, furthermore, a starter motor is connected to the drive train.

BACKGROUND

Hybrid electric vehicles of the aforementioned type are known from DE 10 2004 041 637 A1. Described in said document is a method for controlling the activation of an energy source of a hybrid electric vehicle, in which a vehicle speed value is compared to a first threshold value and to a second threshold value. When the vehicle speed value is less than the first threshold value, the method establishes whether a vehicle brake has been disengaged. When the vehicle speed value is greater than the first threshold value and less than the second threshold value, the method establishes whether an additional acceleration is utilized. The energy source is activated when additional energy is required or when the vehicle brake has been disengaged. The energy source is deactivated when the brake is engaged or when no additional energy is utilized.

This known operating model is utilized, in particular, for controlling the different drives in the starting phase of a hybrid electric vehicle.

SUMMARY

The object of the invention is to solve a completely new problem, namely that of electrically parking with the aid of a hybrid drive, preferably a mild hybrid drive. In this case, the driver should either get out of the vehicle and allow the vehicle to autonomously park or remain in the vehicle and control the electrical energy for parking the vehicle.

According to the invention, this problem is solved in that the electric motor is initially exclusively utilized as the drive for the parking process. When an obstacle, for example, a curb, is to be overcome during the parking process and this obstacle cannot be successfully overcome solely with the aid of the electric motor, the starter motor is to be activated.

The electric motor utilized for driving the vehicle is preferably supplied by a battery which has a higher voltage than a battery which supplies the starter motor. Advantageously, a 48-volt battery is suitable therefor. High-voltage batteries having even higher voltages are also possible, however, in particular higher than 100 V.

The starter motor preferably obtains its energy from a 12-volt battery.

The additional drive via the starter motor is advantageous, in particular, because the transmission ratio from the starter motor to the drive shaft is very high and, therefore, a very strong additional torque can be generated at low speeds which are common for parking. When the starter motor is therefore connected in parallel with the electric motor provided for the electric drive, a very strong torque is generated, which suffices for overcoming usual obstacles such as, for example, a curb.

For the case in which the combined torque of the electric motor and the starter motor is insufficient for overcoming the obstacle, the internal combustion engine can be activated.

When the parking process is carried out by a vehicle comprising an automatic transmission, the parking process can be applied both during reverse parking and during forward parking.

When, however, the parking process is carried out by a vehicle comprising a manual transmission, the parking process is applied, in particular, only during forward parking.

The invention is illustrated by way of example with the aid of two diagrams and is described in the following in detail with reference to the two diagrams. Wherein:

DETAILED DESCRIPTION

As required, detailed embodiments of the present invention are disclosed herein; however, it is to be understood that the disclosed embodiments are merely exemplary of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The method for electric parking according to the invention is suitable, in particular, for mild hybrid electric vehicles which comprise both an electric motor and an internal combustion engine for operation, wherein the motor and the engine can act on the drive train in the form of a parallel hybrid drive. In this operating mode, the forces or torques of the two drives add up. This allows for a weaker design of all motors and engines, whereby costs, weight, and installation space can be reduced.

In this case, the electric-drive portion assists the internal combustion engine in order to increase output and/or allows for a fuel-efficient operating mode of the internal combustion engine. The operating energy can be partially recuperated in a regenerative brake.

In addition, a starter motor for the internal combustion engine is connected to the drive train.

When such a mild hybrid electric vehicle is to be parked autonomously or controlled by a driver, this takes place in two ways, in accordance with an automatic transmission or a manual transmission.

Figure 1:
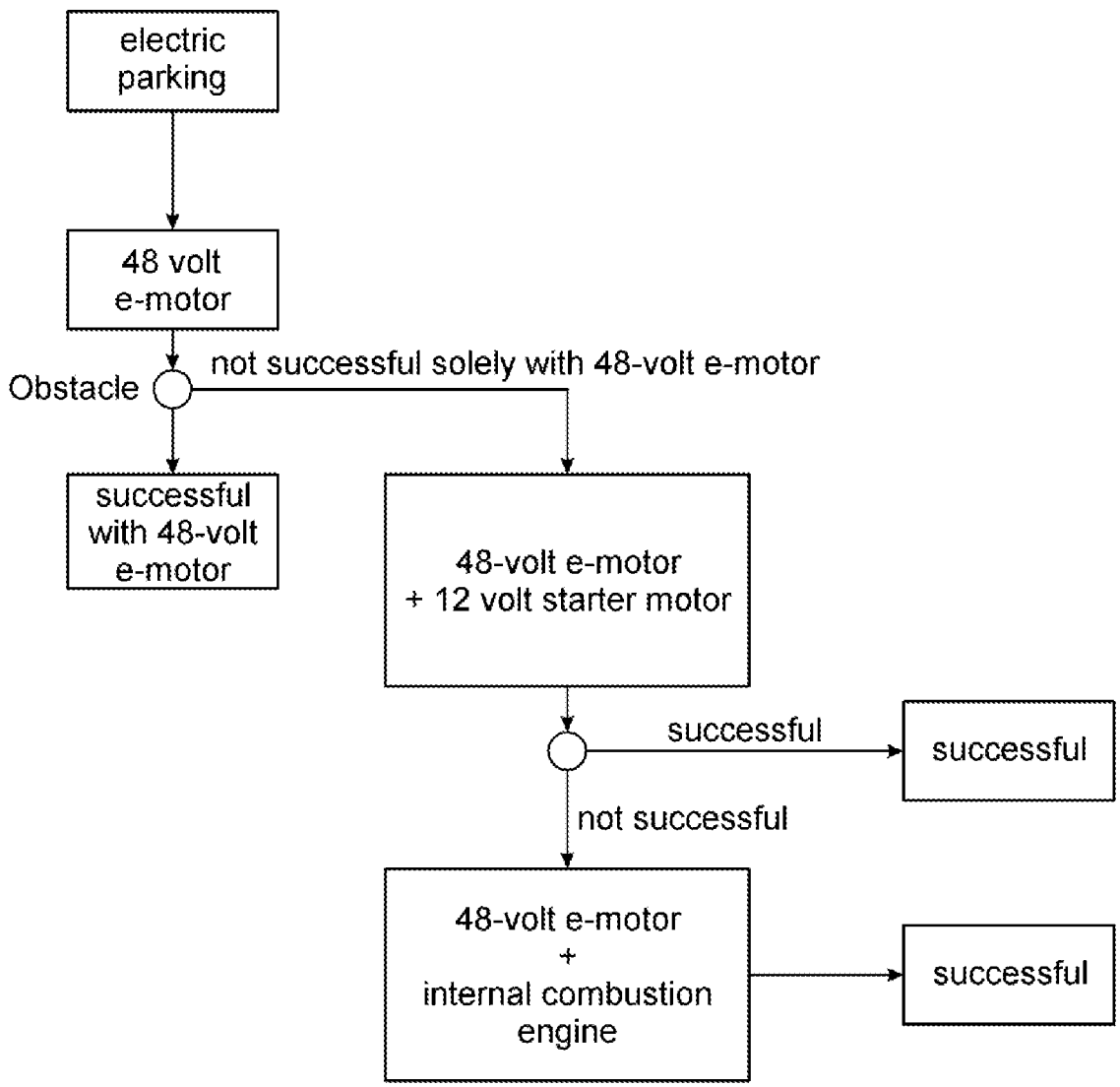
FIG. 1 shows a diagram for the parking process carried out by means of an automatic transmission.

The parking process of a mild hybrid electric vehicle comprising an automatic transmission is illustrated in FIG. 1.

In this case, the electric parking initially exclusively takes place with the aid of an electric motor which is supplied by the 48-volt battery.

When the parking process is impeded by an obstacle, for example a curb, an attempt is initially made to overcome this obstacle with the aid of the electric motor. If the process is successful, the parking process can be concluded.

When the electric motor does not succeed in overcoming the obstacle, the starter motor, which is supplied by a 12-volt battery, is activated. Due to the high transmission ratio thereof, the starter motor delivers—within the scope of the relatively slow vehicle speed—an additional strong torque which possibly suffices for overcoming the obstacle. In this case, an energy source is available, in the form of the 12-volt battery, which is independent of the 48-volt battery.

If the obstacle is overcome, the parking process can be successfully concluded.

If the obstacle is not overcome even by activating the starter motor, it is possible to activate the internal combustion engine. In this case, the starter motor is usually disengaged. If the obstacle is then overcome, the parking process can be successfully concluded.

Figure 2:
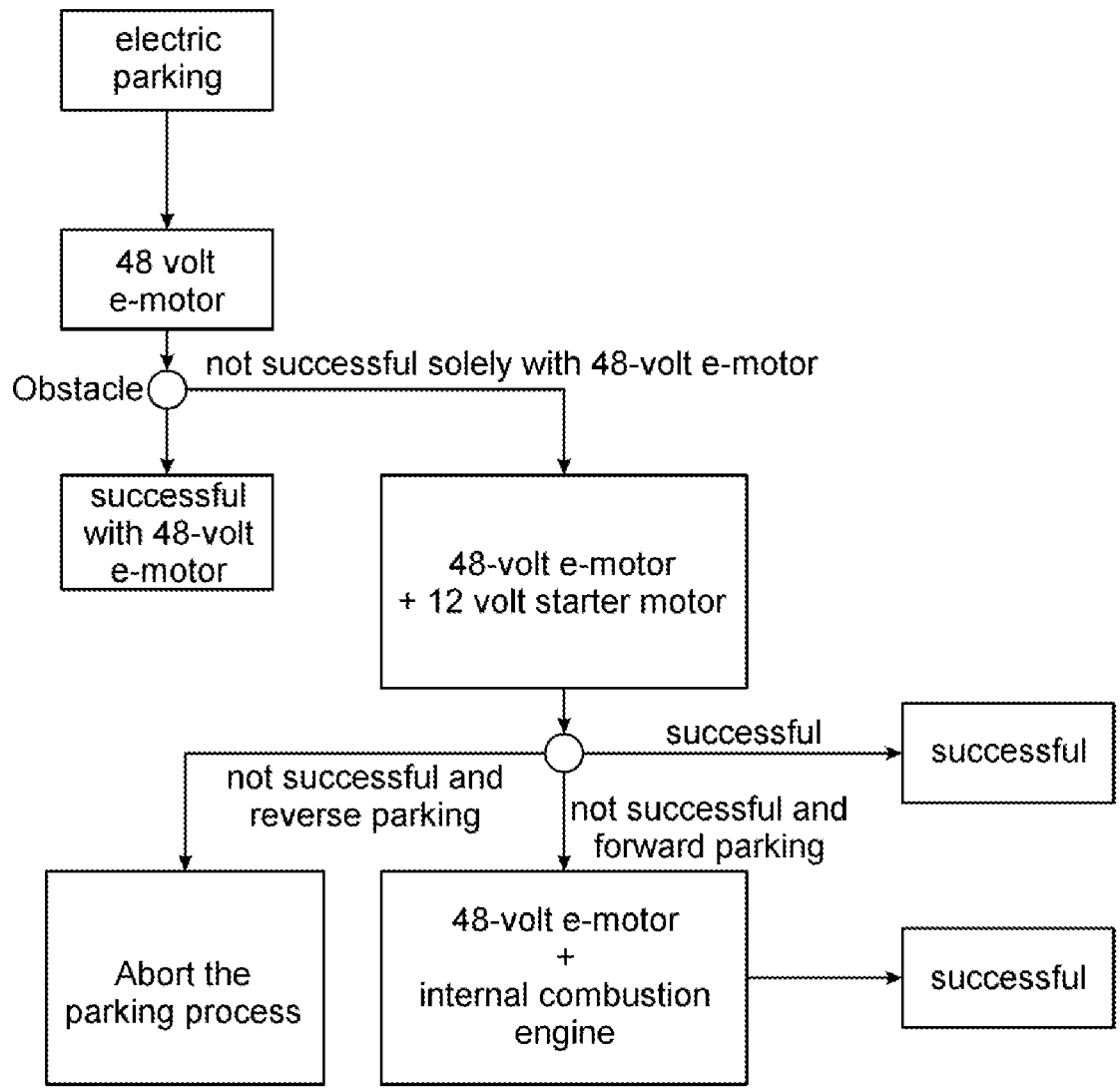
FIG. 2 shows a diagram for the parking process carried out by means of a manual transmission.

The parking process for a vehicle comprising a manual transmission is illustrated in FIG. 2. In this case as well, an initial attempt is made to carry out the parking process with the aid of the electric motor which is driven by the 48-volt battery.

If the possible obstacle is readily overcome in this case, the parking process can be successfully concluded.

If the obstacle is not overcome, the starter motor, which is supplied by the 12-volt battery, is activated, as is likewise the case with the operation with the aid of the automatic transmission.

If the obstacle is overcome and the parking process is successful with the aid of the two electric motors, the parking process can be successfully concluded.

If the obstacle is not overcome, the internal combustion engine can be activated, although only for the forward operation and preferably in combination with an automated clutch. In this case, the starter motor can be disengaged again.

When a reverse operation is required in order to overcome the obstacle, the parking process must be aborted.

The electric parking of a motor vehicle is substantially facilitated with the aid of the method according to the invention and fully suffices for normal operating conditions. Since the parking processes are carried out primarily in densely populated residential areas, a particularly environmentally friendly contribution is made by the invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for controlling a parking process of a hybrid electric vehicle in which an electric motor and an internal combustion engine act on a drive train at a same time and in which a starter motor is connected to the drive train, the method comprising:
   initially during the parking process, exclusively utilizing the electric motor as a drive for the parking process and, responsive to an obstacle impeding the drive for the parking process, activating the starter motor to deliver additional torque for overcoming the obstacle; and
   responsive to a combined torque of the electric motor and starter motor being insufficient for overcoming the obstacle, activating the internal combustion engine.

2. The method as claimed in claim 1, wherein the electric motor is supplied by a battery having a voltage greater than a battery which supplies the starter motor.

3. The method as claimed in claim 1, wherein the electric motor is supplied by a high-voltage battery having more than 100 volts.

4. The method as claimed in claim 1, wherein the starter motor is supplied by a 12-volt battery.

5. The method as claimed in claim 1, wherein the parking process is a reverse parking process or a forward parking process.

6. A vehicle comprising:
   a drive train;
   an electric motor and engine each arranged to act on the drive train;
   a starter motor connected to the drive train; and
   a controller configured to, initially during a parking process, exclusively utilize the electric motor as a drive for the parking process and, responsive to an obstacle impeding the drive for the parking process, first activate the starter motor to augment the drive for the parking process and then selectively start the engine to further augment the drive for the parking process.

7. The vehicle of claim 6, wherein the parking process is a forward parking process or a reverse parking process.

8. The vehicle of claim 6 further comprising an automatic transmission, wherein the parking process is a forward parking process or a reverse parking process.

9. The vehicle of claim 6 further comprising a manual transmission, wherein the parking process is a forward parking process.

10. A vehicle comprising:
    an electric motor, engine, and starter motor; and
    a controller configured to, initially during a parking process, exclusively use the electric motor to drive the vehicle during the parking process and, responsive to an obstacle impeding the parking process, first activate the starter motor and then selectively start the engine to further drive the vehicle during the parking process.

11. The vehicle of claim 10, wherein the parking process is a forward parking process or a reverse parking process.

12. The vehicle of claim 10 further comprising an automatic transmission, wherein the parking process is a forward parking process or a reverse parking process.

13. The vehicle of claim 10 further comprising a manual transmission, wherein the parking process is a forward parking process.

* * * * *